(12) United States Patent
Riday

(10) Patent No.: US 6,575,418 B1
(45) Date of Patent: Jun. 10, 2003

(54) WALL MOUNT ASSEMBLY AND APPARATUS FOR MOUNTING FSO EQUIPMENT TO A WALL

(75) Inventor: Richard Brian Riday, Kirkland, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 10/147,186

(22) Filed: May 15, 2002

(51) Int. Cl.[7] .................................................. A47H 1/10

(52) U.S. Cl. ........................ 248/317; 248/489; 40/757

(58) Field of Search .............................. 248/317, 475.1, 248/489, 470; 40/757

(56) References Cited

U.S. PATENT DOCUMENTS 2,354,622 A * 7/1944 Swartz ........................ 40/160

FOREIGN PATENT DOCUMENTS

DE        3502436   * 7/1986   ................. 248/489

\* cited by examiner

*Primary Examiner*—Kimberly Wood
(74) *Attorney, Agent, or Firm*—Blakely Sokoloff Taylor & Zafman LLC

(57) ABSTRACT

A wall mount assembly and apparatus for mounting equipment, such as free space optical (FSO) equipment, to a wall. In one embodiment, the wall mount assembly comprises a pair of arcuate-shaped backer bars that are slid into a pair of upper holes defined in a portion of wallboard and disposed within an interior portion of the wall upon assembly. A wall plate, disposed on the front side of the wall, is coupled to the backer bars using a plurality of fasteners, which pass through the upper holes in the wallboard and lower holes in the wallboard. Upon assembly, the backer bars and wall plate engage the wallboard, thereby distributing a cantilevered load applied to the plate across a large portion of the wallboard. The apparatus further includes a support member coupled to the wall plate that provides a mounting surface to which equipment, such as FSO equipment, may be mounted.

23 Claims, 8 Drawing Sheets

WALL MOUNT ASSEMBLY AND APPARATUS FOR MOUNTING FSO EQUIPMENT TO A WALL

BACKGROUND OF THE INVENTION

1. Field of the Invention

The present invention generally relates to devices to mount cantilevered loads to a wall, and, more specifically, to a wall mount and apparatus for mounting FSO equipment to a wall.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Wireless optical communications are also known as free-space optical (FSO) or atmospheric optical communications. In a typical free-space optical communication system, a modulated beam of light is directed through free-space from a transmitter at a first location to a receiver at a second location. Data or information is encoded into the beam of light by means of the modulation. Once received by the receiver, the modulated beam of light is demodulated and corresponding data and information may then be extracted. This scheme enables data and information to be transmitted through free-space from the first location to the second location.

In general, FSO systems use two or more optical transceivers to form a network comprising one or more communication "links." These optical transceivers are commonly called FSO terminals. FSO terminals of various configurations are typically mounted on rigid structures, such as buildings and towers, and situated such that each terminal has a line of site to another terminal common to a given link.

Recently, advancements have been made that enable terminals to be located in building offices and the like. Ideally, it is desired to locate the FSO equipment within an office in a manner that is non-intrusive to the people working in the office. In addition, it is desired to mount the FSO equipment to a rigid structure that is substantially uninfluenced by the normal activities performed by those people.

SUMMARY OF THE INVENTION

In accordance with aspects of the present invention, a wall mount assembly and apparatus for mounting free space optical (FSO) equipment to a wall are described herein. In one embodiment, the wall mount assembly comprises a pair of arcuate-shaped backer bars that are slid into a pair of upper holes defined in a portion of wallboard and disposed within an interior portion of the wall upon assembly. A wall plate, disposed on the front side of the wall, is coupled to the backer bars using a plurality of fasteners, which pass through the upper holes in the wallboard and lower holes in the wallboard, thereby creating a sandwich around the portion of wallboard. A tether may be provided to prevent the backer bars from falling down the interior of the wall during assembly.

In one embodiment, the wall mount assembly is employed in the apparatus for mounting FSO equipment to a wall. The apparatus further includes a support member that is coupled to the wall plate at one end and provides a mounting surface at a free end to which the FSO equipment may be mounted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Embodiments of an apparatus for mounting FSO equipment to a wall are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
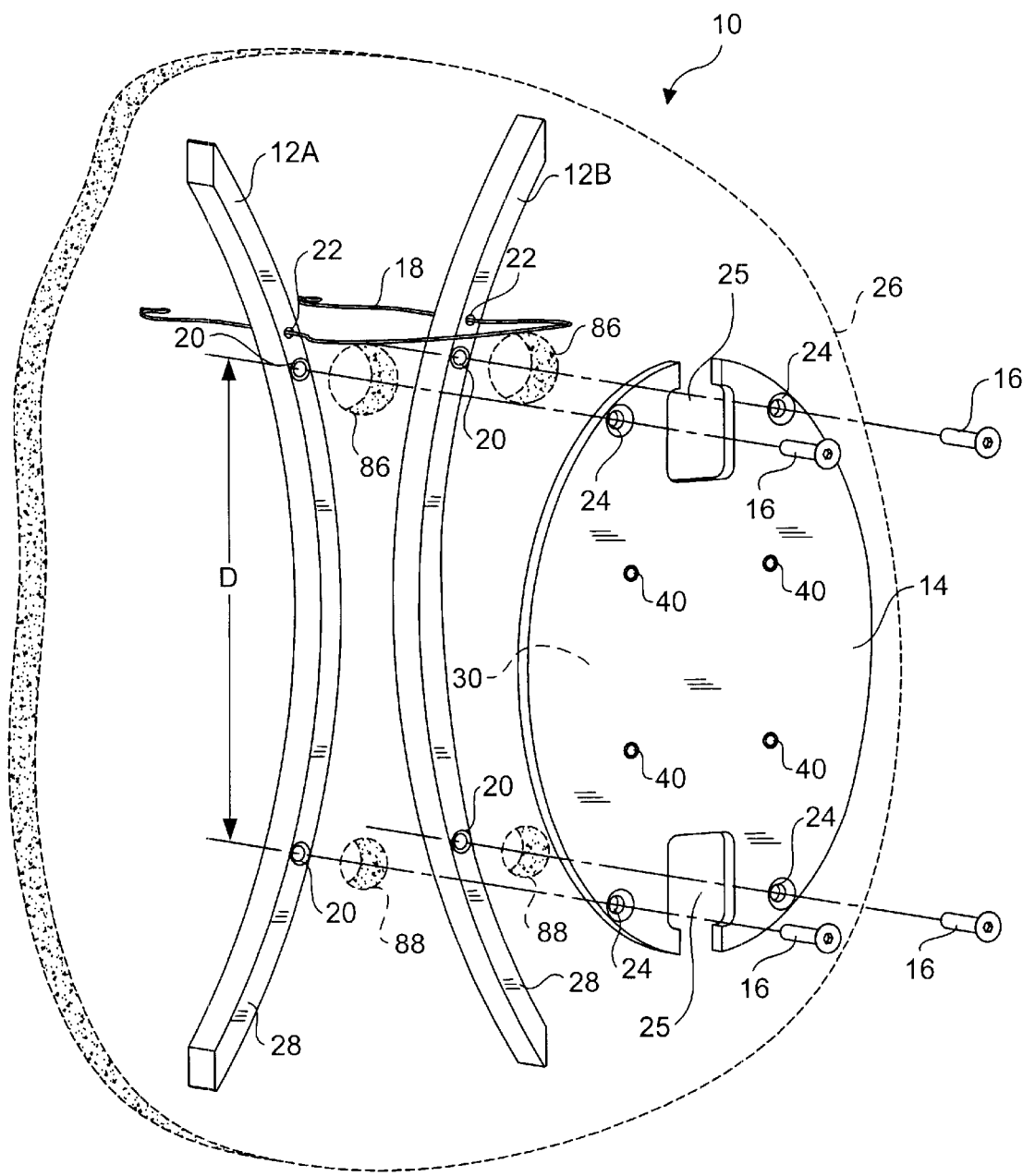
FIG. 1 is an exploded isometric view of a wall mount assembly including a pair of backer bars and wall plate corresponding to an apparatus for mounting FSO equipment to a wall in accordance with one embodiment of the invention.

An exploded view of a wall mount assembly 10 in accordance with one embodiment of the invention is shown in FIG. 1. Wall mount assembly 10 includes a pair of backer bars 12A and 12B, a wall plate 14, and a plurality of fasteners 16. In one embodiment, wall mount assembly 10 further includes a tether 18. In one embodiment, each of backer bars 12A and 12B include a pair of threaded holes 20, and a tether hole 22. Wall plate 14 includes a plurality of holes 24 defining a hole pattern having a configuration such that a vertical distance D between holes, 24 on each side of the wall plate substantially matches the distance between threaded holes 20. In one embodiment, wall plate 14 further includes a pair of cutouts 25, which are used to route cables connected to the FSO equipment (not shown).

Figure 2:
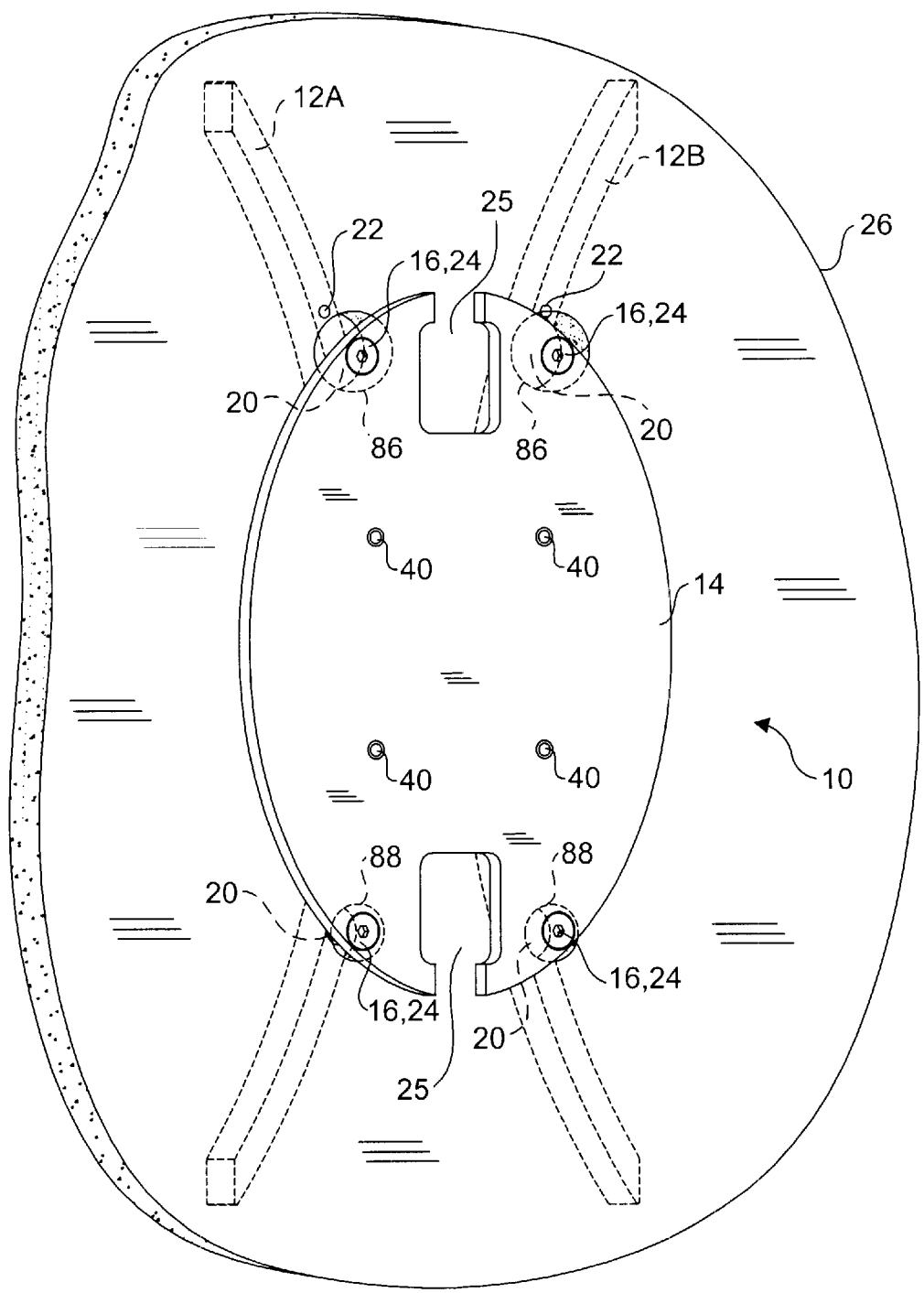
FIG. 2 is an assembled view of the wall mount assembly of FIG. 1.

Details of wall mount assembly 10 upon assembly are shown in FIG. 2. Upon assembly, wall plate 14, which is mounted on the front side of a wallboard 26, is operatively coupled by means of fasteners 16 to backer bars 12A and 12B, which are disposed on a back side of the wallboard. Furthermore, upon assembly, planar faces 28 of backer bars 12A and 12B engage the back side surface of wallboard 26, while a planar face 30 of wall plate 14 engages the front side of the wallboard.

In general, wall mount assembly 10 may be used to mount various types of FSO equipment, such as FSO terminals, to a hollow wall, such as are commonly found in office buildings and the like. Typically, this task will be accomplished through use of a support member or support member assembly. In one embodiment, a cantilevered support member is coupled toward one end to wall plate 14, and provides appropriate mounting provisions, such as a mounting surface, to which the FSO equipment may be coupled. Preferably, the support member or support member assembly should be fairly rigid.

Figure 3:
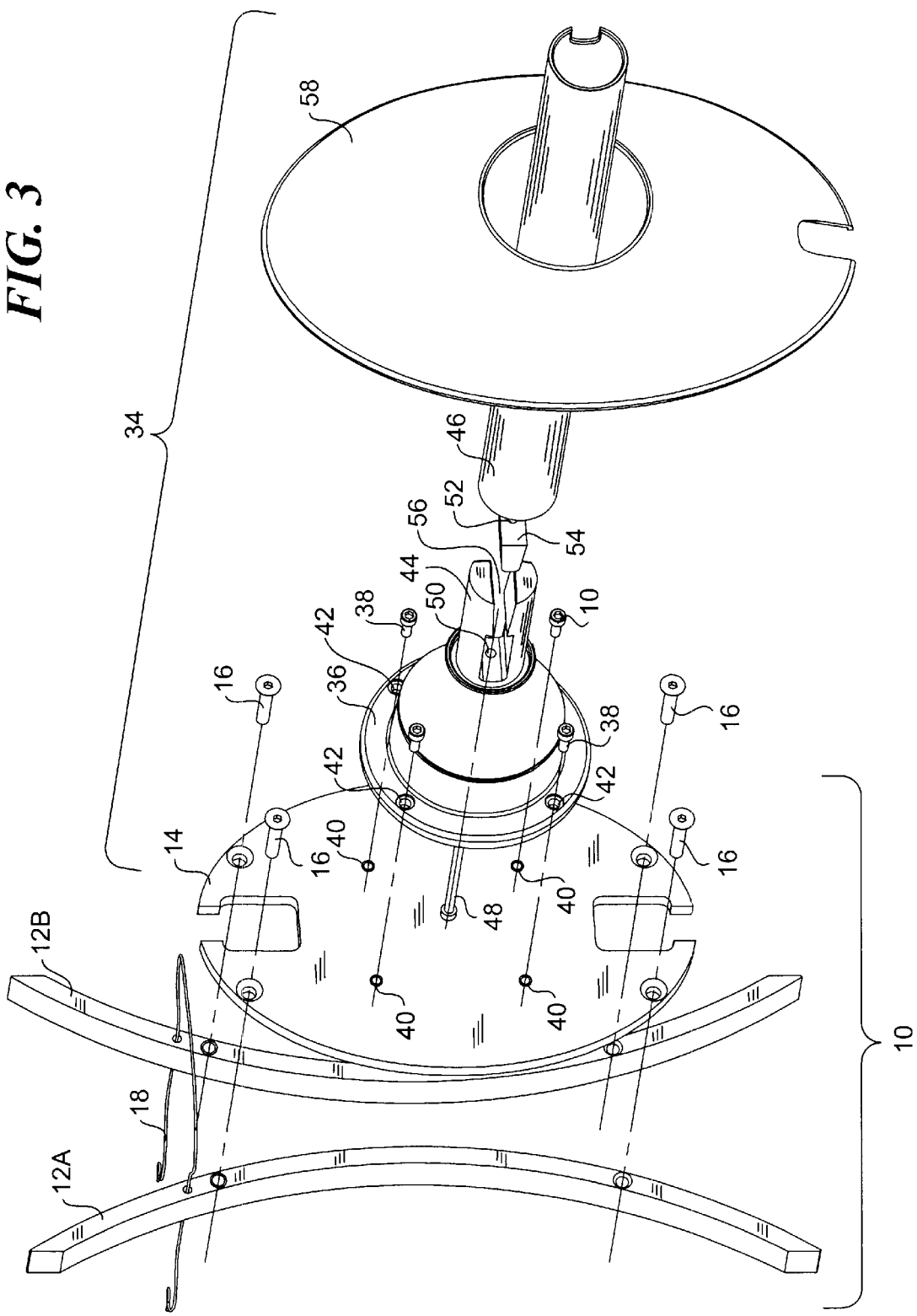
FIG. 3 is an exploded isometric view of an apparatus for mounting FSO equipment to a wall that includes the wall mount assembly of FIG. 1 and further includes a support member assembly coupled to the wall plate.

For example, an exploded view of a support member assembly 34 is shown in FIG. 3. Support member assembly 34 includes a base mount 36 that is mounted to wall plate 14 via a plurality of fasteners 38. Wall plate 14 includes a plurality of threaded holes 40 configured in a hole pattern that matches a hole pattern comprising a plurality of clearance holes 42 defined in the base of base mount 36. An expandable tube clamp 44 extends outwardly from the end of base mount 36, and is fixedly coupled to the base mount using a common coupling technique, such as welding, using a shrink fit, using an adhesive, etc.

Upon assembly, the end portion of a tube 46 is disposed over expandable tube clamp 44. A bolt 48 is inserted into a hole 50 defined through the closed end of expandable tube clamp 44, enabling the threads of bolt 48-to thread into a threaded hole 52 defined in a wedge 54. As bolt 48 is turned, it urges wedge 54 into a slot 56 defined in expandable tube clamp 44, causing the tube clamp to expand. This causes portions of the outer surface of the expandable tube clamp to engage the inner surface of tube 46, which fixedly couples tube 46 to base mount 36 (and thus wall plate 14 upon assembly of base mount 36 to the wall plate). In one embodiment, a cover 58 may be provided to prevent unwanted access to the mount components and/or for aesthetic purposes.

Figure 4:
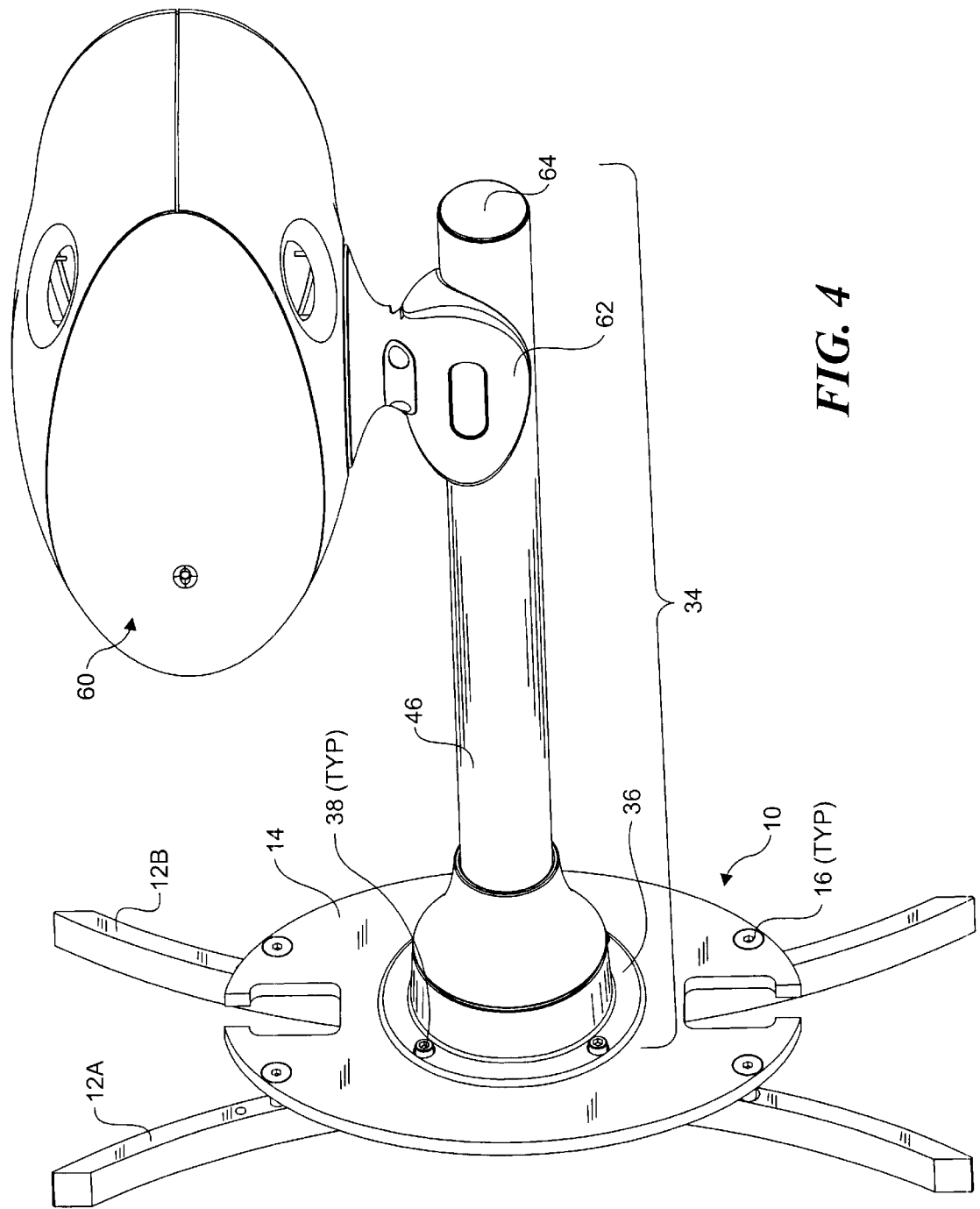
FIG. 4 is an assembled view of the apparatus of FIG. 3, further depicting an FSO terminal mounted toward the free end of the support member assembly.

Details of support member assembly 34 and wall mount assembly 10 upon assembly to a portion of wallboard (not shown) is shown in FIG. 4. Also illustrated is a FSO terminal 60, which is mounted toward the free end of tube 46 via a tube mount 62. A tube end cap 64 may also be provided in this embodiment.

In general, the embodiments of the invention described herein may be used for mounting fairly large cantilevered loads, such as FSO equipment to an interior wall of an office building and the like. This is accomplished by spreading the load over a large portion of the wallboard. Furthermore, since both the mounting plate and the backer bars are engaged with opposing sides of the wallboard upon assembly, the load is spread over a larger area on the backside as well, as compared with conventional wallboard mounting techniques.

Figure 5:
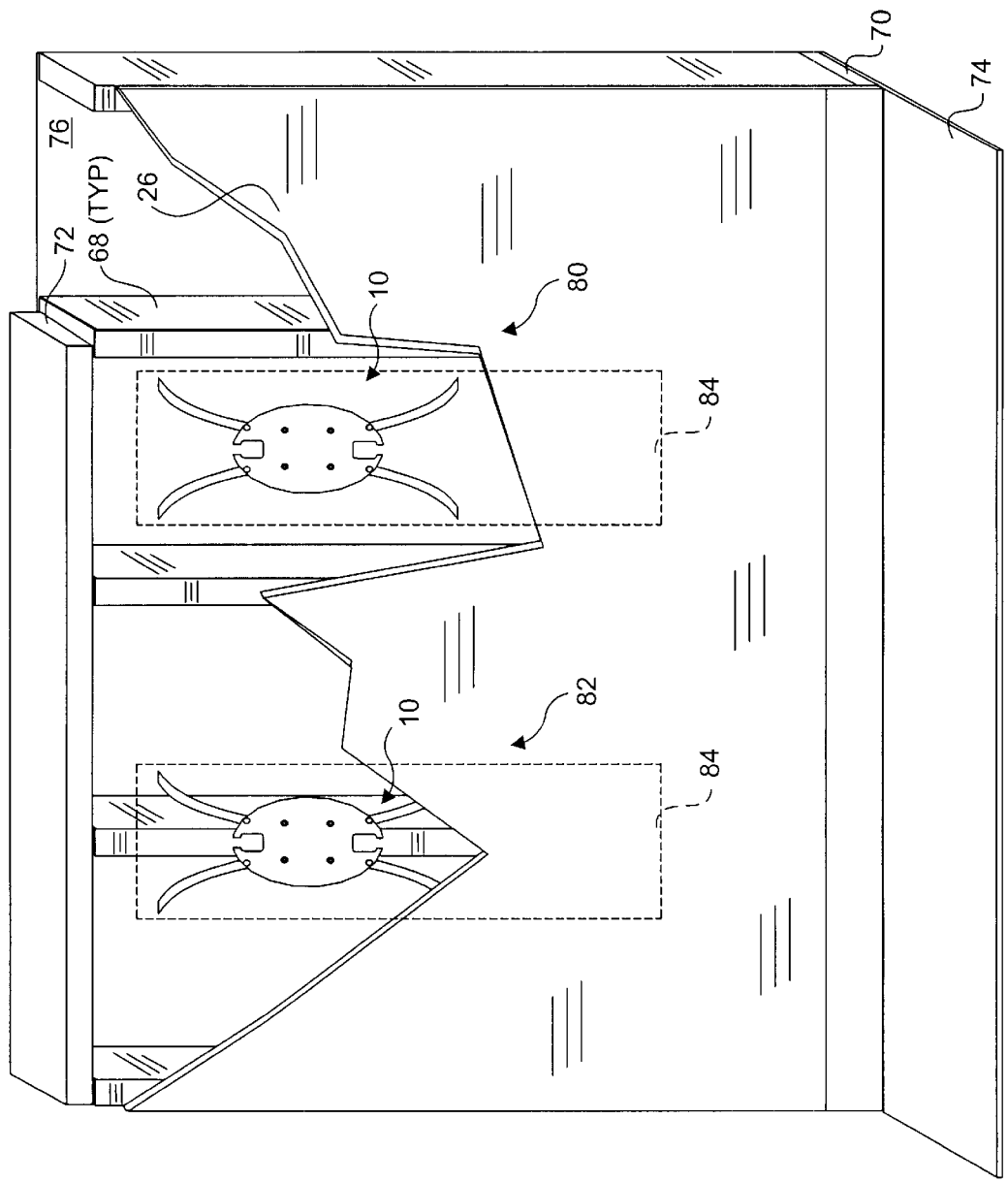
FIG. 5 is a schematic diagram illustrating typical installation configurations in a wall comprising stud and wallboard construction typically used in office building walls.

A hollow wall 64 having a structure similar to a typical interior office wall is shown in FIG. 5. Hollow wall 64 includes a wallboard 66 that is secured to a plurality of studs 68. In general, the studs will be secured to a base plate 70 and a top plate 72, in a configuration commonly used in the construction, industry. Base plate 70 is further coupled to a floor 74. Each of the studs, base plate, and top plate will typically be made of metal and/or wood, and the studs will have a typical depth of 3½ inches with a spacing of 16 or 24 inches, although other stud depths may also be used. If the wall is an interior dividing wall, another wallboard 76 will usually be mounted to the back of studs 68, as illustrated. If the wall is an external wall, studs 68 will generally be coupled to the external wall.

In general, there are two types of mounting configurations that may be used in a typical hollow wall. They include a configuration 80 (preferred), in which wall mount assembly 10 is entirely disposed between adjacent studs, and a configuration 82, in which a mid portion of wall plate 14 is disposed adjacent a single stud and the backer bars are disposed on opposite sides of the stud. In either configuration, an unobstructed zone 84 in the interior of the wall should also be provided. The unobstructed zone extends below the final installed configuration since during the installation a portion of each backer bar will be dropped below to enable the entire backer bar to enter the interior of the wall. If necessary, insulation may have to be removed from the wall to provide an adequate unobstructed zone.

Figure 6:
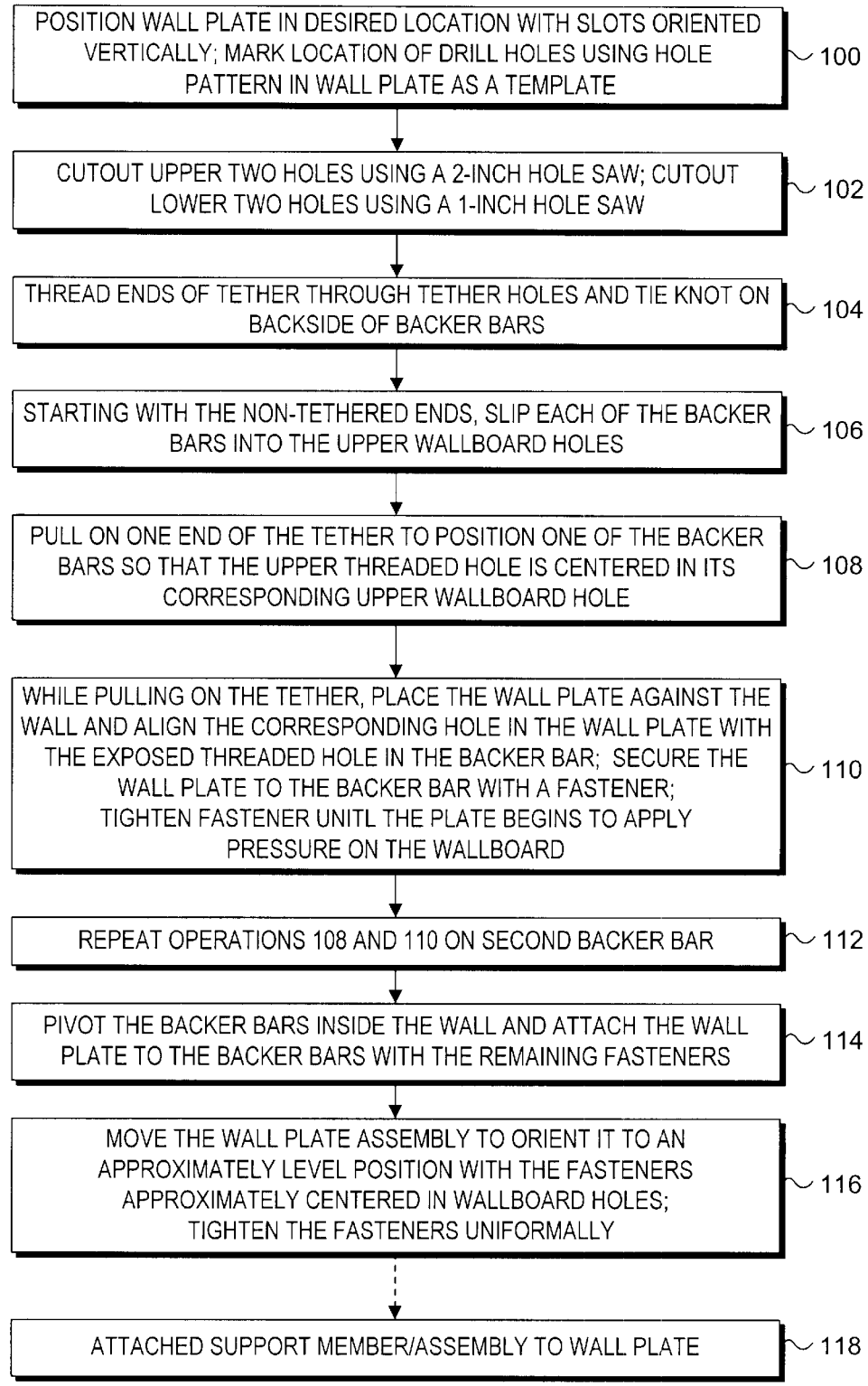
FIG. 6 is a flowchart describing the operations that are performed when installing the backer bar and wall plate assembly of FIG. 1.

With further reference to the flowchart of FIG. 6 and FIGS. 6–8, wall mount assembly 10 may be assembled in the following manner. First, in a block 100, wall plate 14 is positioned in a desired location on the wall, with slots 25 oriented vertically. Once the wall plate has been positioned, the location of the drill holes that will be used during the installation will be marked. Conveniently, the drill holes may be marked using the hole pattern defined in wall plate 14.

The next operation is performed in a block 102, wherein the upper and lower cutouts are defined in the wallboard. In one embodiment, a pair of two-inch upper holes 86 and a pair of one-inch lower holes 88 are defined in wallboard 26. Generally, the upper and lower holes may be formed using one of many techniques for defining cutouts in wallboard, such as using hole saws, routers, Dremels, and various manual and powered bladed saws.

In one embodiment, a tether is used to assist in the assembly process. In general, the tether is used to prevent the backer bars from dropping behind the wallboard. In accordance with the use of a tether and as provided by a block 104, opposite ends of tether 22 are threaded through respective tether holes 22 defined in backer bars 12A and 12B, and a knot is tied toward the ends of the tether. Preferably, the backer bars will be configured in the symmetrical manner shown in the Figures contained herein.

Figure 7:
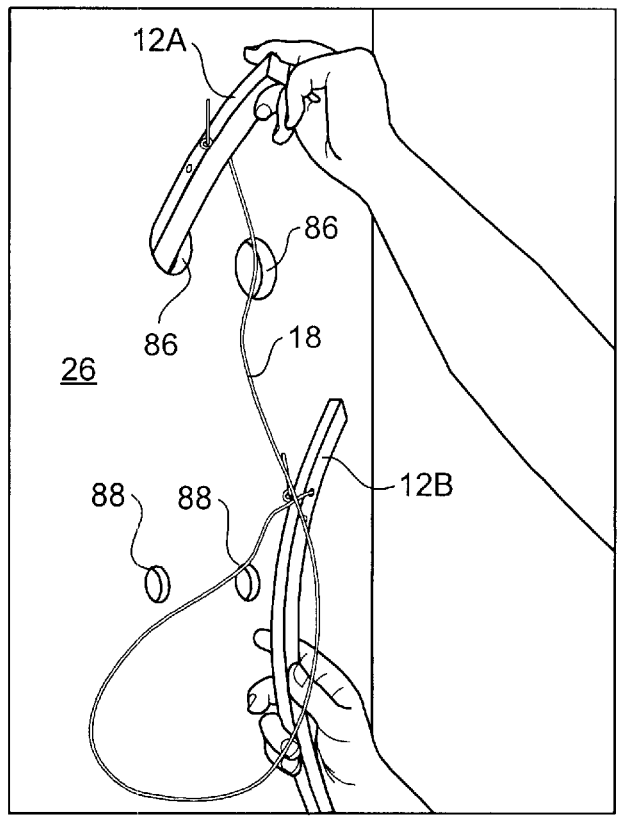
FIG. 7 and 8 illustrate various operations that are performed during installation of the apparatus in accordance with the flowchart of FIG. 6.
Figure 8:
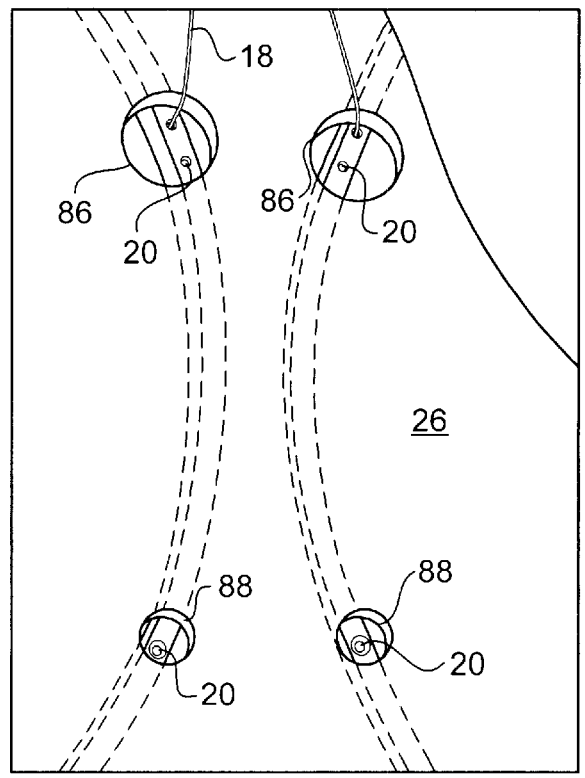

With reference to FIG. 7, in a block 106 each of the backer bars is slipped through a respective upper wallboard hole 86, starting with the non-tethered ends. Next, in a block 108, one end of the tether is pulled to position one of the backer bars so that its upper threaded hole 20 is centered in its corresponding upper wallboard hole. While pulling on the tether, wall plate 10 is placed against the wall and aligned so that the corresponding hole 24 in the wall plate is aligned with its corresponding threaded hole 20 in the backer bar in accordance with a block 110. The wall plate is then secured to the backer bar with a fastener 16. As provided by a block 112, the operations of blocks 108 and 110 are then repeated on the second backer bar.

In a block 114, the backer bars are pivoted inside the wall and the wall plate is attached to the lower threaded holes 20 in the backer bars with the remaining fasteners 16. The wall plate assembly is then moved to an approximately level position win a block 116 with the fasteners approximately centered in the wallboard holes. Finally, in a block 116 the fasteners are then tightened uniformly to engage the front faces of the backer bars with the inside of the wallboard and the back face of the wall plate with the front side of the wallboard. The support member or support assembly may then be attached to the wall plate in a block 118.

Figure 9:
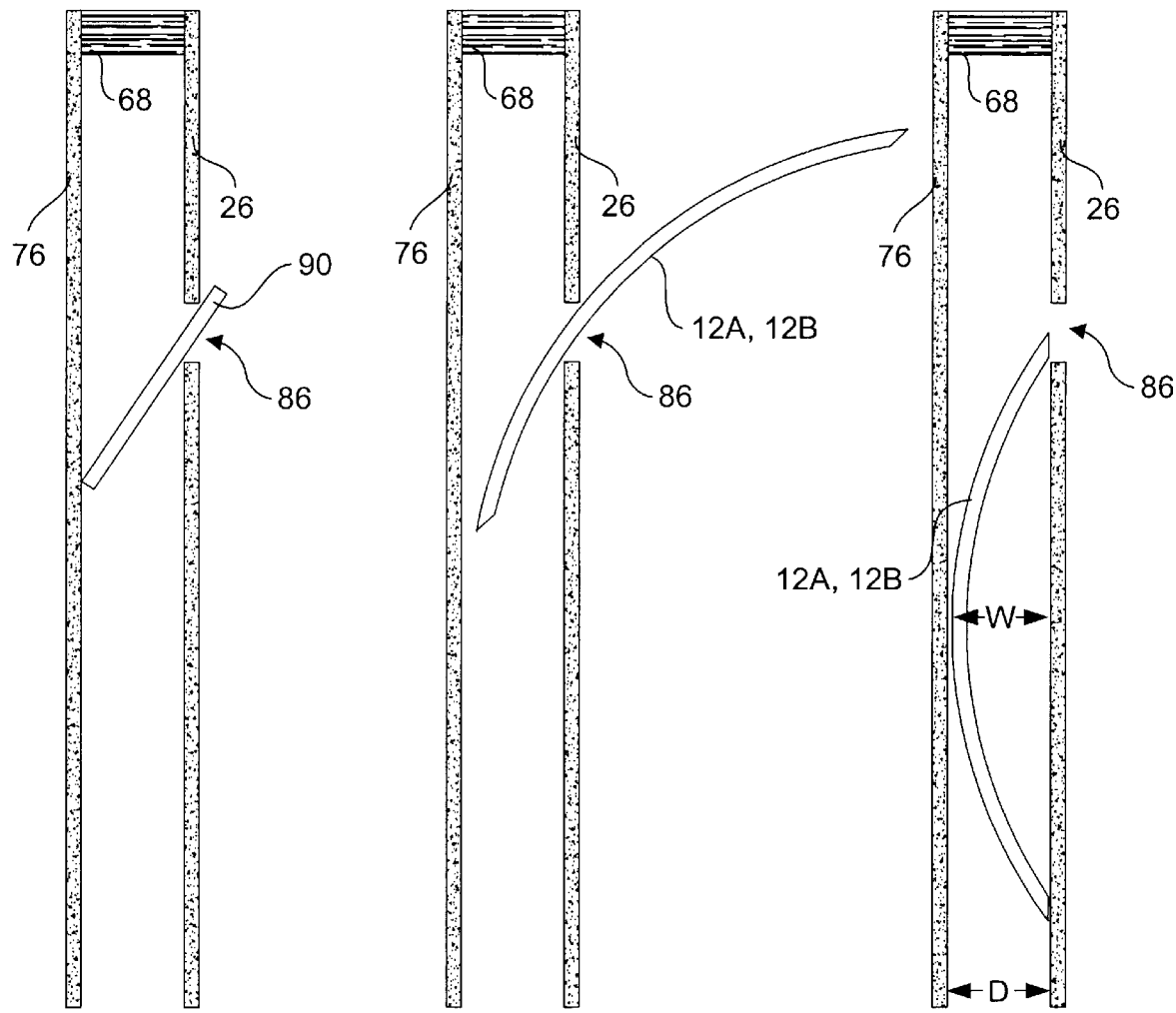
FIG. 9 is a cross-sectional view of a typically stud and wallboard wall installation illustrating one advantage of using arcuate-shaped backer bars over straight-shaped back bars.

The arcuate shape of the backer bars provides two significant advantages. First, as illustrated in FIG. 9, the arcuate shape enables backer bars 12A and 12B to be much longer than a corresponding straight bar 90. For example, in one embodiment each backer bar has a cross-section of ½ inch×1 inch and a length of approximately 20 inches, the hole size (86) is 2 inches, and the stud 86 depth D is 3½ inches. In one embodiment, the width W of the arcuate shape (i.e., the width of a backer bar if it was to be positioned on a vertical surface) is approximately the depth D of the wall studs.

The second advantage pertains to increasing the wall area over which the load is distributed. Once secured in place, the arcuate-shaped backer bars spread the footprint of the apparatus on the backside of the wallboard to the sides of holes 24 in wall plate 14, as illustrated in the Figures herein. In one embodiment, this more than doubles the width of the footprint from approximately 4 inches (i.e., the width spacing of holes 24) to a horizontal span between the tips of the backer bars of approximately 8.25 inches.

Generally, each of the backer bars and wall plate should be made of a structurally-rigid material, such as metals, plastics, and composites. These components may be made by any of various well-known manufacturing techniques, including machining, casting, forging, and molding. In instances in which a plastic or composite is used for the backer bars and the fasteners are threaded fasteners, it may be advisable to install helical inserts, such as Keenserts® and the like, depending on the thread holding capabilities of the material alone.

Various fasteners may be used in addition to the screws depicted in the embodiments illustrated herein. These include but are not limited to various threaded fasteners such as screws, bolts, and self-tapping screws, as well as non-threaded fasteners, such as blind rivets, moly-bolts, and expandable-bushing fasteners. Additionally, both threaded and non-threaded captive fasteners may be used. In instances in which non-threaded fasteners are used, the threaded holes in the backer bars and the wall plate will be replaced with appropriately sized holes.

In the foregoing embodiments, the hole patterns on each of the backer bars where substantially identical. This is not a requirement, as each of the hole patterns may have an independent configuration. Furthermore, in addition to the two-hole configurations discussed above, each backer bar hole pattern may comprise more than two holes, if desired. In such instances, it will be preferable to provide matching hole patterns on the wall plate.

In general, the embodiments of the invention disclosed herein may be implemented to mount loads, such as free space optical communications equipment, to walls in office buildings and the like. Typically, the FSO equipment will be positioned within an office space such that it provides a line of sight optical path with at least one other terminal located in another office, on top of a building or tower, etc. As a result, the FSO equipment will generally be mounted near a window. Furthermore, it will generally be preferred to mount the wall plate toward the top of a wall to minimize interference with the work space and to minimize the possibility that office personnel may come in contact with a laser beam optical signal produced or received by a given FSO terminal.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus for coupling a load to a wall, comprising:
    a first backer bar, comprising an elongated arcuate shape and including a face in which a plurality of holes configured in a first hole pattern are defined;
    a second backer bar, comprising an elongated arcuate shape and including a face in which a plurality of holes configured in a second hole pattern are defined;
    a wall plate having back face through which a plurality of holes are defined, a first portion of said plurality of holes configured in a hole pattern substantially matching the first hole pattern; a second portion of said plurality of holes configured in a hole pattern substantially matching the second hole pattern; and
    a plurality of fasteners, each having a shank portion passing through a respective hole in the wall plate, a wallboard of the wall, and engaging a respective hole in one of the first and second backer bars upon assembly, thereby causing the faces of each of the first and second backer bars to engage a back side of the wallboard, and the back face of the wall plate to engage a front side of the wallboard.

2. The apparatus of claim 1, wherein the holes defined in the first and second backer bars are threaded holes, and said plurality of fasteners comprise threaded fasteners.

3. The apparatus of claim 1, further comprises a tether having opposing ends operatively coupled to the first and second backer bars.

4. The apparatus of claim 3, wherein each of the first and second backer bars further includes a respective tether hole disposed toward a top portion thereof, and a first end of the tether is threaded through the tether hole of the first backer bar and a second end of the tether is threaded through the tether hole of the second backer bar.

5. The apparatus of claim 1, further comprising a support member, operatively coupled to the wall plate toward a first end and providing a mounting surface to which equipment may be coupled toward a second end.

6. The apparatus of claim 5, wherein the equipment comprises a free space optical (FSO) system component.

7. The apparatus of claim 5, wherein the support member comprises a mounting base operatively coupled to a front side of the wall plate and a cantilevered member coupled to the mounting base at a first end.

8. The apparatus of claim 7, wherein the cantilever member comprises a tube.

9. The apparatus of claim 8, wherein the mounting base is coupled to the tube via a tube clamp.

10. The apparatus of claim 5, wherein the wall plate further includes at least one cutout configured to receive wires connected to the equipment.

11. The apparatus of claim 1, wherein the first and second hole patterns are substantially identical, and the first and second backer bars are symmetrically configured upon assembly.

12. The apparatus of claim 1, wherein the fasteners comprise at least one from the group of screws, bolts, blind rivets, captive fasteners, moly-bolts, and expandable-bushing fasteners.

13. The apparatus of claim 1, wherein the apparatus is configured to be attached to a hollow wall having a, stud depth D and the elongated arcuate shape of the first and second backer bars is configured to have a width W that is approximately the same as the stud depth D.

14. An apparatus for mounting free space optical (FSO) equipment to a wall comprising stud and wallboard construction, comprising:
   a pair of backer bars, each comprising an elongated arcuate shape having a substantially planar face in which a plurality of holes configured in a first hole pattern are defined;
   a wall plate having a planer back face through which a plurality of holes configured in a second hole pattern are defined, each hole in the second hole pattern being aligned with a respective hole in one of the pair of backer bars upon assembly;
   a support member, operatively coupled to the wall plate toward a first end and providing a mounting surface to which the FSO equipment may be coupled toward a second end; and
   a plurality of fasteners, each having a shank portion passing through a respective hole in the wall plate and engaging a respective hole in one of the pair of backer bars upon assembly, thereby causing the substantially planar faces of each of the backer bars to engage a back side of a portion of wallboard, and the planar back face of the wall plate to engage a front side of a portion of the wallboard.

15. The apparatus of claim 14, wherein in each of the backer bars are configured such that they may be inserted into a respective hole defined in the wallboard, and are disposed within an interior portion of the wall upon installation.

16. The apparatus of claim 15, wherein each backer bar has a length of at least 20 inches.

17. The apparatus of claim 14, wherein the first hole pattern comprises an upper and lower hole separated by a distance D, and the second hole pattern comprises an upper pair of holes and a lower pair of holes separated by the distance D.

18. The apparatus of claim 14, wherein the holes defined in the first and second backer bars are threaded holes, and said plurality of fasteners comprise threaded fasteners.

19. The apparatus of claim 14, further comprises a tether having opposing ends operatively coupled to the first and second backer bars.

20. The apparatus of claim 14, wherein the wall plate further includes at least one cutout configured to receive wires connected to the FSO equipment.

21. The apparatus of claim 14, wherein the wall includes studs have nominal depth D and the elongated arcuate shape of the backer bars is configured to have a width W that is approximately the same as the nominal depth D.

22. The apparatus of claim 21, wherein the studs have a nominal depth of 3½ inches.

23. The apparatus of claim 14, wherein the fasteners comprise at least one from the group screws, bolts, blind rivets, captive fasteners, moly-bolts, and expandable-bushing fasteners.

* * * * *